(12) United States Patent
Lee (10) Patent No.: US 10,103,660 B2
(45) Date of Patent: *Oct. 16, 2018

(54) LINEAR ACTUATOR, METHOD FOR CONTROLLING THE SAME, AND HEAD LAMP ASSEMBLY COMPRISING THE SAME

(71) Applicant: LG Innotek Co., Ltd., Seoul (KR)

(72) Inventor: Jin Seob Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,043

(22) Filed: Jan. 22, 2018

(65) Prior Publication Data

US 2018/0145619 A1 May 24, 2018

Related U.S. Application Data

(63) Continuation of application No. 15/189,324, filed on Jun. 22, 2016, now Pat. No. 9,912,271.

(30) Foreign Application Priority Data

Jun. 25, 2015 (KR) .................. 10-2015-0090741

(51) Int. Cl.
  *H02P 8/36* (2006.01)
  *G05B 19/404* (2006.01)
  *H02K 7/06* (2006.01)

(52) U.S. Cl.
  CPC .............. *H02P 8/36* (2013.01); *G05B 19/404* (2013.01); *H02K 7/06* (2013.01);
  (Continued)

(58) Field of Classification Search
  CPC ........ G05B 19/404; G05B 2219/37094; G05B 2219/37124; G05B 2219/37277;
  (Continued)

(56) References Cited

U.S. PATENT DOCUMENTS 5,210,476 A    5/1993  Kazato
8,294,391 B2 * 10/2012  Kubo ..................... H02P 3/24
                                      310/12.19
(Continued)

FOREIGN PATENT DOCUMENTS

DE          10241214 A1     3/2004
EP           1719662 A1    11/2006
KR     10-2014-0030752 A    3/2014

OTHER PUBLICATIONS

Extended European Search Report dated Oct. 27, 2016 in European Application No. 16175608.5.

(Continued)

*Primary Examiner* — Muhammad S Islam
(74) *Attorney, Agent, or Firm* — Saliwanchik, Lloyd & Eisenschenk (57) ABSTRACT

The present invention provides an actuator including a motor; a lead screw rotating by coupling to the motor; a nut part moving forward or backward by coupling to the lead screw; a magnet coupled to the nut part; a sensor unit configured to sense a change amount of magnetic flux depending on a position of the magnet and convert the sensed change amount of magnetic flux into measured voltage data; and a control unit controlling the motor; wherein the magnet comprises a first pole and a second pole arranged in order in the movement direction of the nut part, wherein, if the sensor unit senses the first pole when the nut part is moved forward, the control unit performs a first motion in which a forward movement of the nut part is stopped and moves the nut part backward, and if the sensor unit senses the second pole after the first motion, the control unit performs a second motion in which the movement of the nut part is stopped and moves the nut part forward.

8 Claims, 6 Drawing Sheets

(52) U.S. Cl.
CPC .............. *G05B 2219/37094* (2013.01); *G05B 2219/37124* (2013.01); *G05B 2219/37277* (2013.01); *G05B 2219/41099* (2013.01); *G05B 2219/41206* (2013.01); *G05B 2219/50043* (2013.01)

(58) Field of Classification Search
CPC ........... G05B 2219/41099; G05B 2219/50043; H02K 7/06; H02P 8/36
See application file for complete search history.

(56) References Cited

U.S. PATENT DOCUMENTS

| | | | |
|---|---|---|---|
| 2004/0046508 A1* | 3/2004 | Ishida | B60Q 1/10 315/77 |
| 2006/0125439 A1* | 6/2006 | Ajima | B60K 6/26 318/716 |
| 2009/0323367 A1* | 12/2009 | Lee | B60Q 1/076 362/469 |
| 2014/0145711 A1 | 5/2014 | Burdette et al. | |

OTHER PUBLICATIONS

Motion Designs Inc., Design Trends, quarterly publication, Nov. 2010, pp. 1-15.

\* cited by examiner

LINEAR ACTUATOR, METHOD FOR CONTROLLING THE SAME, AND HEAD LAMP ASSEMBLY COMPRISING THE SAME

CROSS-REFERENCE TO RELATED APPLICATIONS

This application is a continuation of U.S. application Ser. No. 15/189,324, filed Jun. 22, 2016, which claims the benefit under 35 U.S.C. § 119 of Korean Patent Application No. 10-2015-0090741, filed on Jun. 25, 2015, which are hereby incorporated by reference in their entirety.

BACKGROUND

1. Field of the Invention

The present invention relates to an actuator, a method for controlling the same, and a head lamp assembly comprising the same, more particularly, to an actuator converting a rotational force of a motor into a linear movement, a method for controlling the same and a head lamp assembly comprising the same.

2. Discussion of Related Art

A motor is provided with a shaft which is rotatably formed, a rotor coupled to the shaft, and a stator secured inside a housing, and the stator is installed along a periphery of the rotor with a space therebetween. In addition, a coil is wound around the stator to form a rotating magnetic field so that an electrical interaction between the coil and the rotor is caused to induce rotation of the rotor.

Power output from the motor as described above is a rotational force. Therefore, in order to utilize the rotational force of the motor as power by which a component is moved linearly, a separate power converting means is required. The example of such a power converting means can be an actuator including a motor in which a lead screw is mounted.

Recently, a variable type head lamp which can maximally secure a driver's visual field at night in response to a steering direction of the driver has been proposed, and the motor in which the lead screw is mounted may be employed as the actuator which realizes swiveling and leveling of the head lamp.

In general, the motor realizing the linear driving as above can be referred to as a step motor, and a nut to be connected to a component may be mounted on a lead screw of the step motor.

In the step motor mentioned above, if a restriction occurs in connection relations between components or a control pulse is not output, the components are not located at their target positions, and it is difficult for a user to verify the above fault due to a characteristic that the step motor is controlled via the uni-directional pulse.

SUMMARY OF THE INVENTION

The present invention is to solve the above-mentioned problems, an object of the present invention is to provide an actuator capable of sensing a position of a component which is being linearly moved by a motor to perform compensation control if a fault is detected.

The object to be solved by the present invention is not limited to that stated above, and other objects which are not stated above will be clearly understood by those skilled in the art through the following description.

In order to achieve the above object, an actuator of the present invention includes a motor; a linear driving unit coupled to the motor and including a magnet; a sensor unit configured to sense a change amount of magnetic flux depending on a position of the magnet; a data unit in which reference voltage data corresponding to the change amount of magnetic flux depending on the position of the magnet is stored; and a judging unit configured to compare the reference voltage data with the measured voltage data at the corresponding position of the magnet.

An actuator of the present invention may further include a position compensating unit configured to control driving of the motor such that a difference value between the reference voltage data and the measured voltage data is equal to or less than a reference value if the difference value between the reference voltage data and the measured voltage data judged in the judging unit exceeds the reference value.

The linear driving unit may include a lead screw coupled to the motor and a nut part coupled to the lead screw.

An actuator of the present invention may further include an control unit configured to control the motor to align positions of the nut part and the sensor unit with respect to the linear movement direction of the nut part.

The nut part includes the magnet and the magnet may include a first pole and a second pole arranged in the movement direction of the nut part.

The first pole and the second pole may be arranged in order of the first pole and the second pole with respect to the linear movement direction of the nut part.

The control unit may control the motor to allow a boundary line between the first pole and the second pole to be located on a center of the sensor unit with respect to the linear movement direction of the nut part.

If the sensor unit senses the first pole when the nut part is moved forward, the control unit may perform a first motion in which a forward movement of the nut part is stopped and a backward movement of the nut part is carried out, and if the sensor unit senses the second pole after the first motion, the control unit may perform a second motion in which the movement of the nut part is stopped and a forward movement of the nut part is carried out.

The control unit may repeatedly perform the first motion and the second motion a reference number of times.

In order to achieve the above object, the present invention discloses a method for controlling an actuator including a motor, a linear driving unit coupled to the motor and including a magnet, and a sensor unit sensing the magnet, the method including a) sensing a change amount of magnetic flux depending on a position of the magnet and converting the sensed changed amounted of magnetic flux into measured voltage data; b) comparing reference voltage data corresponding to the change amount of magnetic flux depending on a position of the magnet with the measured voltage data; and c) if a difference value between the reference voltage data and the measured voltage data exceeds a reference value, controlling driving of the motor such that the difference value is equal to or less than the reference value.

The linear driving unit may include a lead screw coupled to the motor and a nut part coupled to the lead screw.

The method may further include, before step a), d) controlling the motor to align positions of the nut part and the sensor unit with respect to the linear movement direction of the nut part.

In step d), the nut includes the magnet, the magnet includes a first pole and a second pole arranged in the movement direction of the nut part, and the motor may be controlled to allow a boundary line between the first pole and the second pole to be located on a center of the sensor unit with respect to the linear movement direction of the nut when the first pole and the second pole are arranged in order of the first pole and the second pole with respect to a linear movement direction of the nut part.

In step d), if the sensor unit senses the first pole when the nut part is moved forward, a first motion in which a forward movement of the nut part is stopped and a backward movement of the nut part is performed may be carried out, and if the sensor unit senses the second pole after the first motion, a second motion in which the movement of the nut part is stopped and a forward movement of the nut part is performed may be carried out.

In step d), the first motion and the second motion may be repeatedly carried out a reference number of times.

In order to achieve the above object, the present invention discloses a head lamp assembly, comprising, a motor; a lead screw rotating by coupling to the motor and rotating; a nut part moving forward or backward by coupling to the lead screw; a magnet coupled to the nut part; a sensor unit configured to sense a change amount of magnetic flux depending on a position of the magnet; a control unit controlling the motor; and a headlamp coupled to the nut part; wherein the magnet comprises a first pole and a second pole arranged in order in the movement direction of the nut part, wherein, if the sensor unit senses the first pole when the nut part is moved forward, the control unit performs a first motion in which a forward movement of the nut part is stopped and moves the nut part backward, and if the sensor unit senses the second pole after the first motion, the control unit performs a second motion in which the movement of the nut part is stopped and moves the nut part forward.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The objects, specific advantages and novel characteristics of the present invent will become more apparent from the following description and the preferred embodiments which are taken in conjunction with the accompanying drawings. In addition, terms or words used in this detailed description and the claims should not be construed as being limited to typical or dictionary definitions, but should be understood with meanings and concepts within the technical scope of the present disclosure based on the principle that an inventor is able to appropriately define the concepts of terms to describe his or her invention in the best way. In the detailed description of the present invention, furthermore, the detailed description of related well-known technologies which can obscure the substance of the present invention is omitted for clarity and conciseness.

Terms including the ordinal numerals such as "second," "first," etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component. The term "and/or" encompasses both combinations of the plurality of related items disclosed and any item from among the plurality of related items disclosed.

Figure 1:
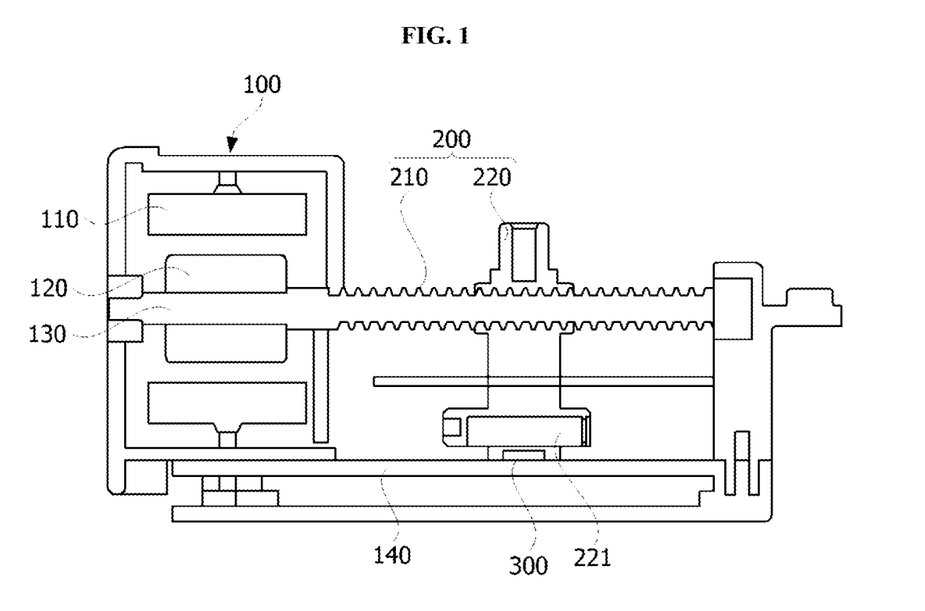
FIG. 1 is a view illustrating an actuator according to one embodiment of the present invention.

FIG. 1 is a view illustrating an actuator according to one embodiment of the present invention. FIG. 1 clearly shows major distinguishing parts such that the present invention can be clearly and conceptually understood. As a result, various modifications of the structure shown in FIG. 1 are expected and a scope of the present invention is not limited by the specific structure shown in FIG. 1.

Figure 2:
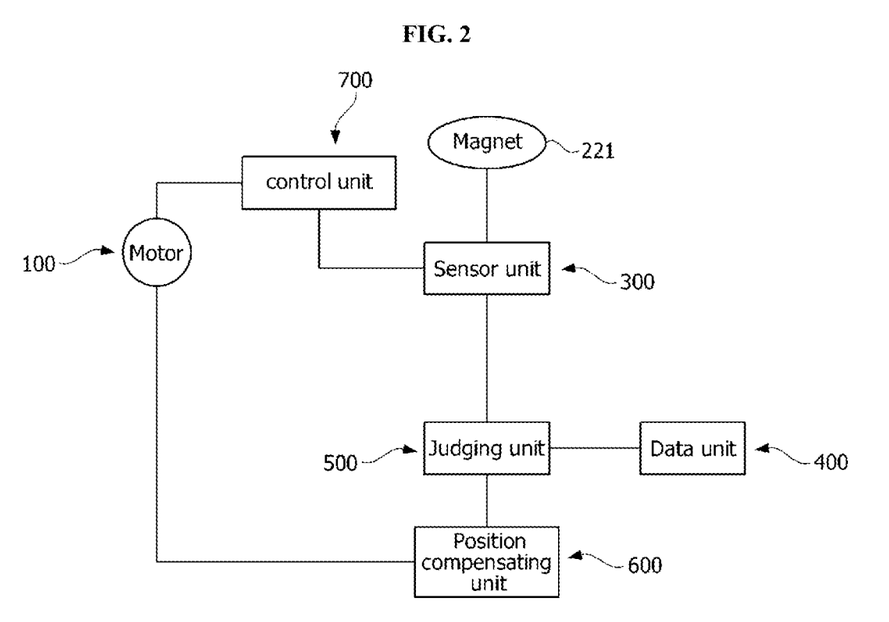
FIG. 2 is a block diagram illustrating an actuator shown in FIG. 1.

FIG. 2 is a block diagram illustrating an actuator shown in FIG. 1.

Referring to FIG. 1 and FIG. 2, an actuator may include a motor 100, a linear driving unit 200, a sensor unit 300, a data unit 400, a judging unit 500 and a position compensating unit 600. The sensor unit 300, the data unit 400 and the judging unit 500 may be included in a control module which drives the motor 100.

The motor 100 and the linear driving unit 200 are units which convert a rotational movement into a linear movement and transmit a driving force to a subject to which an actuator is applied. A step motor may be employed as the motor and the linear driving unit. The motor 100 may include a stator 110, a rotor 120 and a shaft 130.

The stator 110 has a stator core formed thereon, teeth may be formed along a periphery of the stator core, and a coil may be wound around the teeth of the stator for forming a rotating magnetic field. An insulator may be mounted on the stator core to insulate the stator core from the coil.

The rotor 120 is rotatably disposed inside the stator 110. The rotor 120 is rotated by an electromagnetic interaction between the coil wound around the stator and the rotor. The shaft 130 may be coupled to a central portion of the rotor 120. Therefore, if the rotor 120 is rotated, the shaft 130 is rotated together with the rotor. The rotor 120 may be realized in the form of a structure in which a magnet is included inside a rotor core or in which a magnet is attached to an outer circumference surface of the rotor core.

The linear driving unit 200 may include a lead screw 210 and a nut part 220. Although the shaft 130 and the lead screw 210 can be separately described according to a shape and function thereof, they may be one means formed by vertically connecting the shaft and the lead screw. The nut part 220 is screw-coupled to the lead screw 210. The nut part 220 may be moved linearly along the lead screw 210 in response to rotation of the lead screw 210.

In addition, the nut part 220 is a part connected to a component. Here, the component may be a head lamp mounted on a motor vehicle. Specifically, the nut part may be directly connected to a reflector of the head lamp or may be indirectly connected to a frame or reflector of the head lamp via a connecting member such as a link. As the nut part 220 is linearly reciprocated, the head lamp is swiveled and leveled to enable an irradiation direction of the light emitted from the head lamp to be changed.

Referring to FIG. 1 and FIG. 2, the sensor unit 300 is arranged on a bottom surface of a guide 140 to sense a change amount of magnetic flux caused by a magnet 221 included in the nut part 220. The sensor unit 300 may be a Hall sensor which converts a change of magnetic field into a voltage through the Hall effect.

Figure 3:
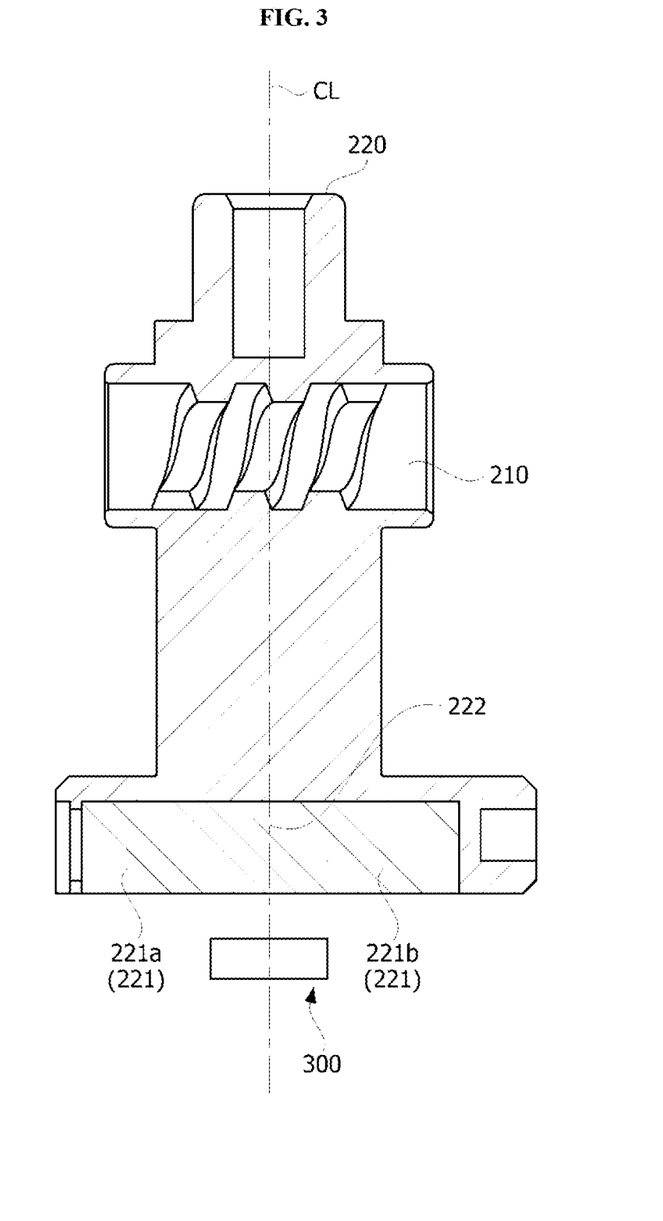
FIG. 3 is a view illustrating a magnet of a nut part and a sensor part.

FIG. 3 is a view illustrating the magnet of the nut part and the sensor unit.

Referring to FIG. 1 to FIG. 3, the magnet 221 in an opened shape may be attached to a lower portion of the nut part 220. In addition, the sensor unit 300 may be disposed on the bottom surface of the guide 140 to face a lower portion of the magnet 221. When a movement direction of the nut part 220 is defined as a widthwise direction of the nut part 220 and a widthwise direction of the sensor unit 300, an imaginary vertical reference line (CL in FIG. 3) passing through a widthwise-directional center of the sensor unit 300 may be a position of an origin point which is a movement base of the nut part 220. For this reason, a position of the nut part 220 may be adjusted to allow a widthwise-directional center of the nut part 220 to be aligned with the vertical reference line (CL in FIG. 3) when the nut part 220 is initially driven.

With respect to the widthwise direction of the nut part 220, a first magnet 221a with an N pole may be mounted on one side of the magnet 221 and a second magnet 221b with an S pole may be mounted on the other side of the magnet 221.

The nut part 220 may be disposed such that a boundary line 222 between the first magnet 221a and the second magnet 221b is aligned with the vertical reference line (CL in FIG. 3) if the nut part 220 is located at the origin point at which driving of the nut part is started.

The sensor unit 300 senses a change amount of magnetic flux in real time when the nut part 220 is moved, converts the sensed change amount of magnetic flux into measured voltage data and transmits the measured voltage data to the judging unit 500.

The data unit 400 stores the measured voltage data. In the data unit 400, the voltage corresponding to the change amount of magnetic flux depending on a position of the nut part 220 with respect to the movement direction of the nut part 220 is stored in the form of a table in advance in the fault-free state. Specifically, as the nut part 220 is moved from the vertical reference line (CL in FIG. 3), the change amount of magnetic flux sensed by the sensor unit 300 is changed. In addition, the sensor unit 300 converts the changed change amount of magnetic flux, which is being changed, into the voltage. After the nut part 220 is moved, the voltage which is obtained by converting the change amount of magnetic flux in the sensor unit 300 is stored in the data unit 400 at every certain time or certain rotation angle of the motor. The above voltage is referred to as reference voltage data. The above reference voltage data becomes a criterion for judging whether the step motor or the nut part 220 is faulty.

The judging unit 500 compares the measured voltage data with the reference voltage data at a prescribed position of the nut part 220, that is, at a specific rotation angle of the motor 100, to judge whether the motor or the nut part is faulty.

A position of the nut part 220 which corresponds to a rotation angle of the motor 100 is determined, and if the pulse is not output from the control module of the motor 100 or a fault occurs under mechanical conditions of the nut part 220 and the component, the measured voltage data differs from the reference voltage data. If the error between the measured voltage data and the reference voltage data at the prescribed position of the nut part 220 exceeds a specific reference value, the nut part 220 may not be in its predetermined origin position. When the fault occurs in this way, if the component is the head lamp, the problem of not realizing a targeted irradiation angle of the light may be encountered. Here, in view of an output of the motor 100, a length of the lead screw 210, a condition of the component, etc., the reference value regarding the error between the measured voltage data and the reference voltage data may be appropriately determined. If an error between the measured voltage data and the reference voltage data exceeds the specific reference value, the judging unit 500 transmits the above error to the position compensating unit 600.

After the nut part 220 is driven, the judging unit 500 can compare the measured voltage data with the reference voltage data at every certain time.

The position compensating unit 600 feedback-controls the motor 100 until the error between the measured voltage data and the reference voltage data is compensated to a value within a specific reference value range in the judging unit 500. The position compensating unit 600 may apply the pulse to the motor 100 for compensating a distance corresponding to a difference between a position of the nut part 220 corresponding to the measured voltage data and a position of the nut part 220 corresponding to the reference voltage data.

Figure 4:
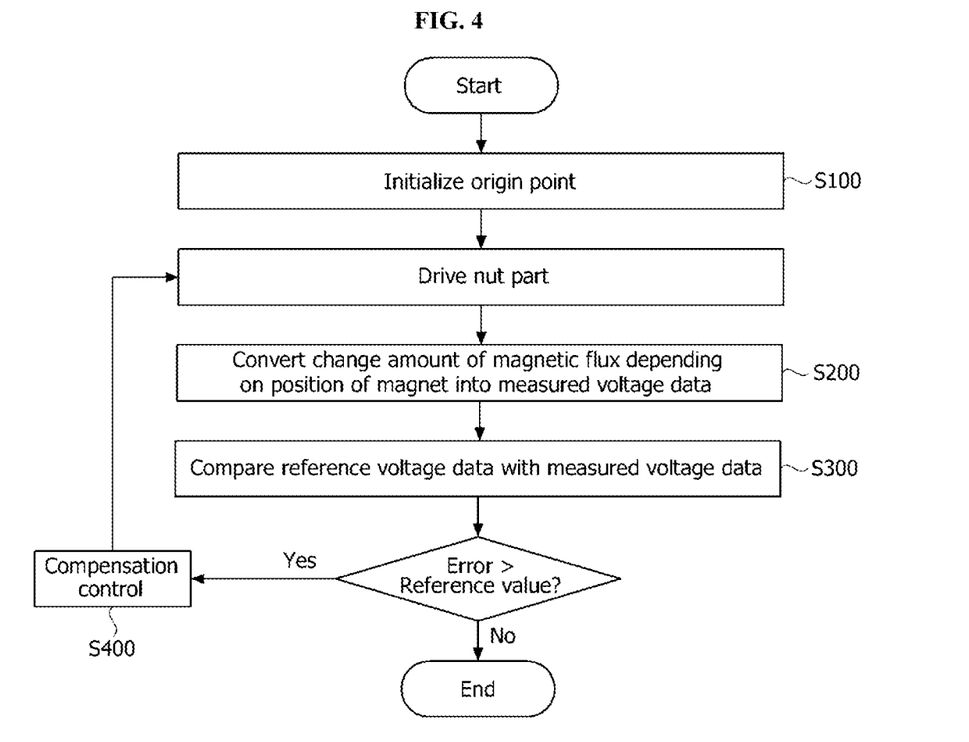
FIG. 4 is a view illustrating a method for controlling an actuator according to one embodiment of the present invention.

FIG. 4 is a view illustrating a method for controlling an actuator according to one embodiment of the present invention.

The method for controlling an actuator according to one embodiment of the present invention is as below.

Referring to FIG. 3 and FIG. 4, an origin point initializing process is performed first (S100).

The origin point initializing process is a process for moving the nut part 220 to a drive starting position. In this origin point initializing process, the position of the nut part 220 is adjusted such that the boundary line 222 is located between the first magnet 221a and the second magnet 221b on the imaginary vertical reference line (CL in FIG. 3) with respect to the sensor unit 300.

The vertical reference line (CL in FIG. 3) corresponds to a reference position at which driving of the nut part 220 is started.

Figure 5:
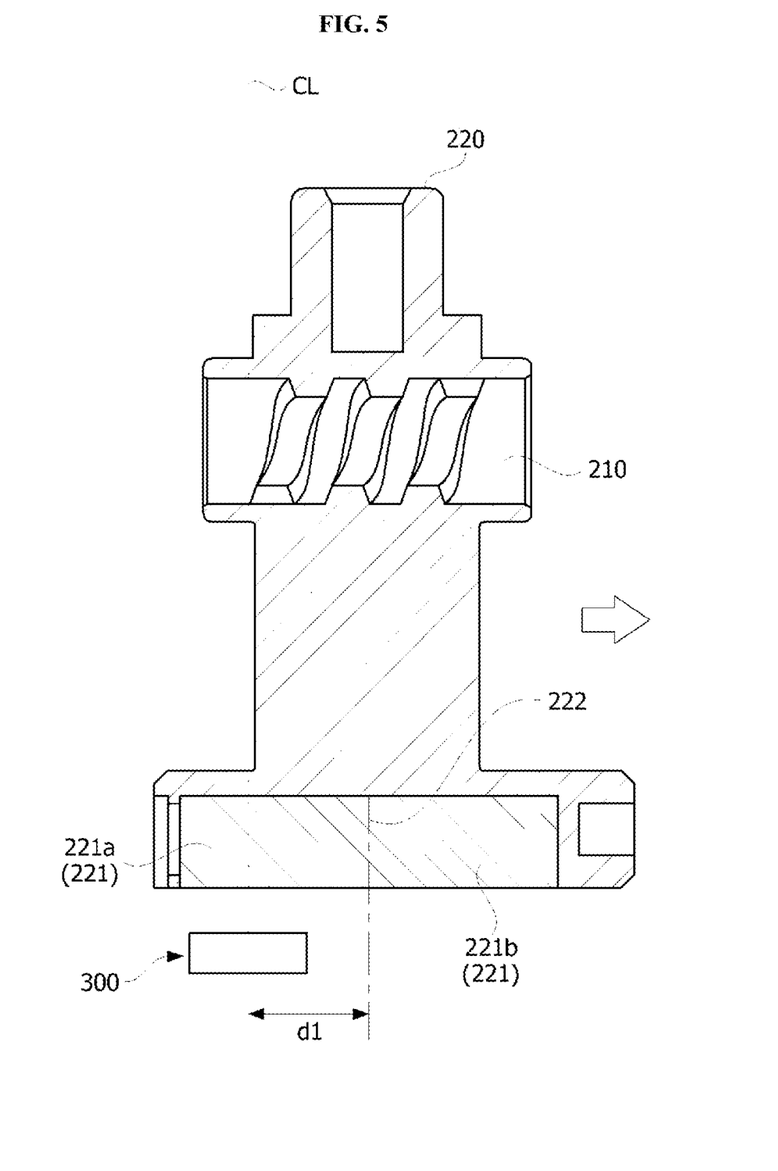
FIG. 5 and FIG. 6 are views illustrating a process for initializing an origin point of a nut part.
Figure 6:
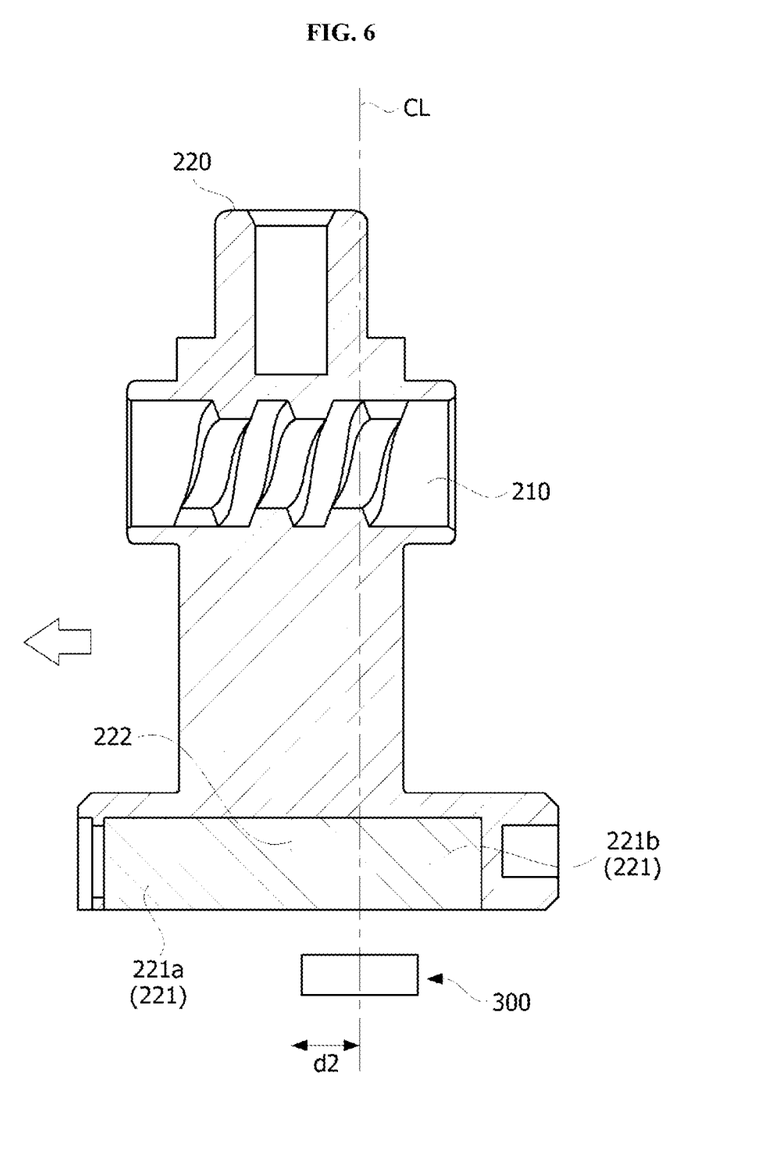

FIG. 5 and FIG. 6 are views illustrating the origin point initializing process for the nut part.

First, in the state in which the nut part 220 is disposed at a side of the motor 100 with respect to the nut part 220, an control unit 700 controls the motor 100 to allow the nut part 220 to move forward. Once the nut part 220 moves forward and passes the vertical reference line (CL in FIG. 3) and the sensor unit 300 senses the first magnet 221a, the control unit 700 controls the motor 100 to stop the movement of the nut part 220 and allow the nut part to move backward. Hereinafter, the above process is referred to as a first motion.

During the backward movement of the nut part 220 caused by the first motion, if the second pole is sensed, the control unit 700 controls the motor 100 to stop the movement of the nut part 220 and allow the nut part to move forward. Hereinafter, the above process is referred to as a second motion The control unit 700 repeats the first motion and the second motion several times to perform the origin point initializing process.

Assuming that a distance between the vertical reference line CL and the boundary line 222 with respect to the movement direction of the nut part 220 when the movement of the nut part 220 is stopped during the first motion is called "d1" and a distance between the vertical reference line CL and the boundary line 222 with respect to the movement direction of the nut part 220 when the movement of the nut part 220 is stopped during the second motion is called "d2," the magnitudes of d1 and d2 may be reduced as the first motion and the second motion are repeated several times.

The reference number of times for the repetition of the first and second motions may be variously changed and determined according to the characteristics of the motor 100, the linear driving unit 200 and the sensor unit 300.

If the nut part 220 is moved after the origin point initializing process, the sensor unit 300 senses the change amount of magnetic flux depending on the position of the magnet 221 and converts the sensed change amount of magnetic flux into the measured voltage data (S200).

Next, the judging unit 500 compares the measured voltage data with the reference voltage data of the data unit 400 at the prescribed position of the nut part 220, that is, at a specific rotation angle of the motor 100 to judge whether a fault has occurred (S300). If the component is a head lamp for a motor vehicle, at this time, the prescribed position of the nut part 220 may be the position of the nut part 220 at which an angle of the lamp corresponding to a command from a lamp control module is realized.

Next, if the judging unit 500 judges that the error between the measured voltage data and the reference voltage data at the prescribed position of the nut part 220 exceeds the specific reference value, the position compensating unit 600 feedback-controls the motor 100 until the error between the measured voltage data and the reference voltage data is compensated to the value within the specific reference value range.

An actuator according to one preferable embodiment of the present invention and the method for controlling the same have been described above in detail with reference to the accompanying drawings.

According to one embodiment of the present invention, the position of the nut part of the motor is sensed and the measured voltage data is compared with the reference voltage data indicating the reference position of the nut part, and if an error has occurred, the position of the motor is compensation-controlled so that the feedback control is performed in the step motor to secure performance of the product to which the present invention is applied.

In addition, according to one embodiment of the present invention, the present invention is advantageous in that, since the compensation-control structure is realized through the feedback control performed by employing the Hall sensor which is relatively inexpensive, a manufacturing cost of the product to which the present invention is applied can be remarkably reduced.

It should be understood that the above embodiment is not limitative, but illustrative in all aspects, and the scope of the invention will be defined by the appended claims rather than by the description. In addition, it should be construed that the meaning and scope of the claims as well as all modifications and variations derived from the equivalent concept of the claims are included within the scope of the present invention.

REFERENCE NUMERALS

100: Motor
110: Stator
120: Rotor
130: Shaft
200: Linear driving unit
210: Lead screw
220: Nut part
221: Magnet
221a: First magnet
221b: Second magnet
300: Sensor unit
400: Data unit
500: Judging unit
600: Position compensating unit

What is claimed is:

1. An actuator, comprising:
a motor;
a lead screw rotating by coupling to the motor;
a nut part moving forward or backward by coupling to the lead screw;
a magnet coupled to the nut part;
a sensor unit configured to sense a change amount of magnetic flux depending on a position of the magnet; and
a control unit controlling the motor;
wherein the magnet comprises a first pole and a second pole arranged in order in the movement direction of the nut part, and
wherein, if the sensor unit senses the first pole when the nut part is moved forward, the control unit performs a first motion in which a forward movement of the nut part is stopped and moves the nut part backward, and if the sensor unit senses the second pole after the first motion, the control unit performs a second motion in which the movement of the nut part is stopped and moves the nut part forward.

2. An actuator of claim 1, wherein the control unit repeatedly performs the first motion and the second motion a reference number of times.

3. An actuator of claim 1, further comprising a data unit in which reference voltage data corresponding to the change amount of magnetic flux depending on the position of the magnet is stored; and
a judging unit configured compare the reference voltage data with the measured voltage data at the corresponding position of the magnet.

4. An actuator of claim 3, further comprising a position compensating unit configured to control driving of the motor such that a difference value between the reference voltage data and the measured voltage data is equal to or less than a reference value if the difference value between the reference voltage data and the measured voltage data judged in the judging unit exceeds the reference value.

5. A method for controlling an actuator in which a nut including a magnet moves forward or backward by a motor and a sensor detects a position of the magnet,
the method comprising;
a) aligning a boundary line between the first pole and the second pole with a center of the sensor unit,
wherein, step a) comprises:
a-1) if the sensor unit senses the first pole when the nut part is moved forward, a first motion in which a forward movement of the nut part is stopped and moving the nut part backward; and
a-2) if the sensor unit senses the second pole after the first motion, a second motion in which the movement of the nut part is stopped and moving the nut part forward.

6. The method of claim 5, further comprising, after step a), b) sensing a change amount of magnetic flux depending on a position of the magnet and converting the sensed changed amounted of magnetic flux into measured voltage data;

c) comparing reference voltage data corresponding to the change amount of magnetic flux depending on the position of the magnet with the measured voltage data; and d) if a difference value between the reference voltage data and the measured voltage data exceeds a reference value, controlling driving of the motor such that the difference value is equal to or less than the reference value.

7. The method of claim 6, wherein, in step d), the first motion and the second motion are repeatedly carried out a reference number of times.

8. A head lamp assembly, comprising:

a motor;

a lead screw rotating by coupling to the motor and rotating;

a nut part moving forward or backward by coupling to the lead screw;

a magnet coupled to the nut part;

a sensor unit configured to sense a change amount of magnetic flux depending on a position of the magnet;

a control unit controlling the motor; and a head lamp coupled to the nut part;

wherein the magnet comprises a first pole and a second pole arranged in order in the movement direction of the nut part, wherein, if the sensor unit senses the first pole when the nut part is moved forward, the control unit performs a first motion in which a forward movement of the nut part is stopped and moves the nut part backward, and if the sensor unit senses the second pole after the first motion, the control unit performs a second motion in which the movement of the nut part is stopped and moves the nut part forward.

* * * * *